United States Patent
Xing et al.

(10) Patent No.: US 6,545,883 B2
(45) Date of Patent: Apr. 8, 2003

(54) INTEGRATED BOOST-ASYMMETRICAL HALF-BRIDGE CONVERTER

(75) Inventors: Kun Xing, Marlborough, MA (US); William H. Martin, Franklin, MA (US)

(73) Assignee: Artesyn Technologies, Inc., Boca Raton, FL (US)

(*) Notice: Subject to any disclaimer, the term of this patent is extended or adjusted under 35 U.S.C. 154(b) by 0 days.

(21) Appl. No.: 09/850,504

(22) Filed: May 7, 2001

(65) Prior Publication Data

US 2002/0167821 A1 Nov. 14, 2002

(51) Int. Cl.[7] ............................................. H02M 3/335
(52) U.S. Cl. .................... 363/21.11; 363/17; 363/98; 363/132
(58) Field of Search .................. 363/21.06, 21.1, 363/21.11, 24, 25, 26, 98, 127, 131, 132, 17

(56) References Cited

U.S. PATENT DOCUMENTS

| | | |
|---|---|---|
| 4,441,146 A | 4/1984 | Vinciarelli |
| 5,126,931 A | 6/1992 | Jitaru |
| 5,245,520 A | 9/1993 | Imbertson |
| 5,282,123 A | 1/1994 | Boylan et al. |
| 5,303,138 A | 4/1994 | Rozman |
| 5,331,533 A | 7/1994 | Smith |
| 5,353,212 A | 10/1994 | Loftus, Jr. |
| 5,434,768 A | 7/1995 | Jitaru |
| 5,535,112 A | 7/1996 | Vazquez Lopez et al. |
| 5,541,828 A | 7/1996 | Rozman |
| 5,786,990 A * | 7/1998 | Marrero ....................... 363/131 |
| 5,907,481 A | 5/1999 | Svärdsjö |
| 5,991,167 A * | 11/1999 | Van Lerberghe ............ 363/132 |
| 6,038,142 A | 3/2000 | Fraidlin et al. |
| 6,064,580 A * | 5/2000 | Watanabe et al. ............ 363/127 |
| 6,137,698 A * | 10/2000 | Yukawa et al. .............. 363/127 |
| 6,163,139 A | 12/2000 | Symonds |
| 6,239,993 B1 * | 5/2001 | Fraidlin et al. ............. 363/132 |

OTHER PUBLICATIONS van der Berg et al., "A Family of Low EMI Unity Power Factor Converters," *IEEE Transactions on Power Electronics*, vol. 13, No. 3, May 1998, pp 547–555.

* cited by examiner

Primary Examiner—Michael Sherry
Assistant Examiner—Gary L. Laxton
(74) Attorney, Agent, or Firm—Kirkpatrick & Lockhart LLP (57) ABSTRACT

A DC-to-DC switch-mode power converter. The converter includes a transformer having first and second series-connected primary windings, a first capacitor connected in series to the second primary winding, a first switch for cyclically coupling an input voltage to the first primary winding, a second capacitor, and a second switch for cyclically coupling the first and second primary windings to the second capacitor. The converter may also include a control circuit for alternately driving the first and second switches such that the first and second switches are not simultaneously conductive. The transformer includes at least one secondary winding having a secondary circuit coupled thereto. The secondary circuit may include a rectification circuit employing self-driven synchronous MOSFETs.

60 Claims, 8 Drawing Sheets

INTEGRATED BOOST-ASYMMETRICAL HALF-BRIDGE CONVERTER

BACKGROUND OF INVENTION

1. Field of Invention

The present invention relates generally to power conversion and, more generally, to DC-DC switch-mode power converters.

2. Description of the Background

DC-to-DC power converters are power-processing circuits that convert an unregulated input DC voltage to a regulated DC output voltage. There are two basic methodologies for accomplishing regulated power conversion. The first is called "linear regulation" because the regulation characteristic is achieved with one or more semiconductor devices operating in the linear region. Linear regulators provide the advantages of simplicity, low output noise, fast response times, and excellent regulation. They may, however, be unacceptably inefficient in certain applications.

The second methodology is called "switch-mode" conversion, which, in contrast to linear regulation, offers the powerful advantage of high efficiency. In this case, the voltage conversion is achieved by switching one or more semiconductor devices rapidly between their "on" (or conducting) state and their "off" (or non-conducting) state such that the appropriate amount of energy is transferred to the load. This principle is called pulse width modulation (PWM).

Switch-mode DC-to-DC power converters typically include an inverter, a transformer having a primary winding coupled to the inverter, and a rectifier circuit coupled to a secondary winding of the transformer. The inverter typically includes an actively controlled semiconductor switch that converts the DC input voltage to an alternating voltage, which is magnetically coupled from the primary winding of the transformer to the secondary winding. The rectifier circuit rectifies the alternating voltage on the secondary winding to generate a desired DC output voltage. An output filter is also typically included to smooth the output voltage and/or current.

To achieve high efficiency and high performance power conversion, it is desirable to use low voltage rating switching devices for better switching and conduction characteristics. It is also desirable to employ converter circuits with relatively continuous power transfer to alleviate the need for heavy filtering for the output and/or input.

Figure 1:
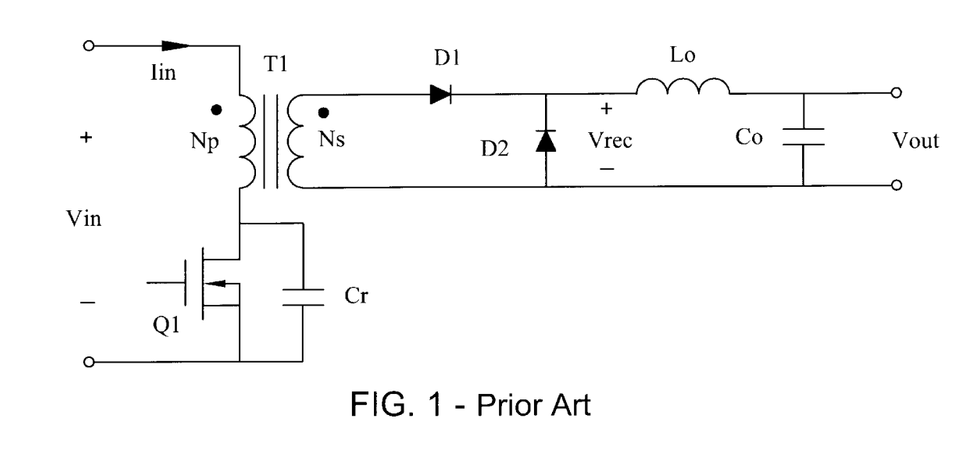
FIG. 1 is a diagram of a prior art resonant-reset forward converter.
Figure 2:
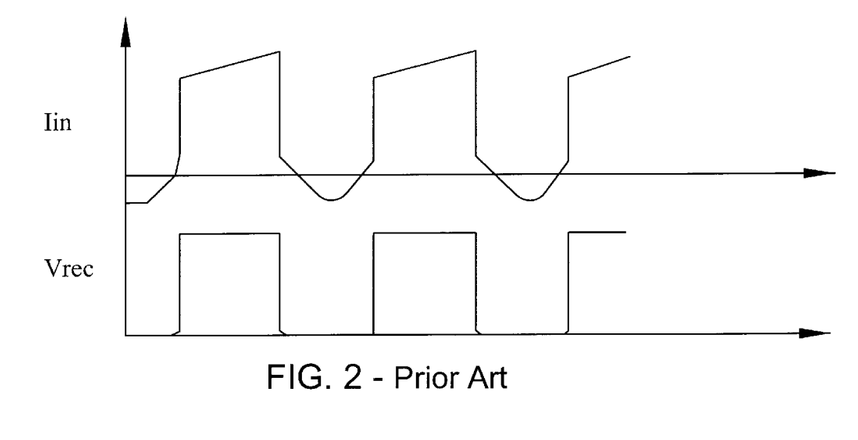
FIG. 2 provides typical waveforms of input current and rectifier output voltage of the resonant-reset forward converter of FIG. 1.

One known switch-mode converter is the single-ended forward converter with a passive reset circuit. Such a circuit topology, a resonant-reset forward converter, is illustrated in FIG. 1. When the primary side power switch Q1 is turned on, the input voltage $V_{in}$ is coupled to the secondary side of the converter through the transformer T1. The secondary side voltage is rectified to provide the DC output voltage $V_{out}$. When the primary side power switch Q1 is turned off, the magnetizing flux of the transformer T1 is reset by the voltage appearing on the resonant capacitor Cr, and the output choke current free wheels through the rectifier D2. Typical waveforms for the input current $I_{in}$ and the rectified voltage $V_{rec}$ for the resonant-reset forward converter of FIG. 1 are illustrated in FIG. 2.

The major drawback of this type of converter is that the voltage stress on the semiconductor devices, such as the switch Q1, is very high. Thus, semiconductor switches with higher voltage ratings ordinarily have to be utilized. In addition, the resonant-reset forward converter is not very efficient with synchronous rectification, discussed later, especially for wide input voltage ranges and large load variations.

Figure 3:
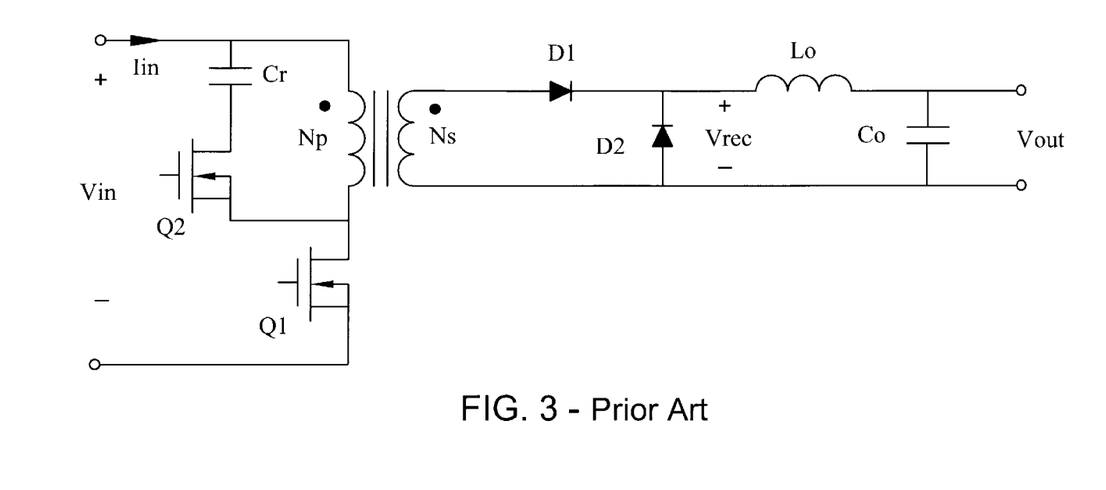
FIG. 3 is a diagram of a prior art active-clamp forward converter.
Figure 4:
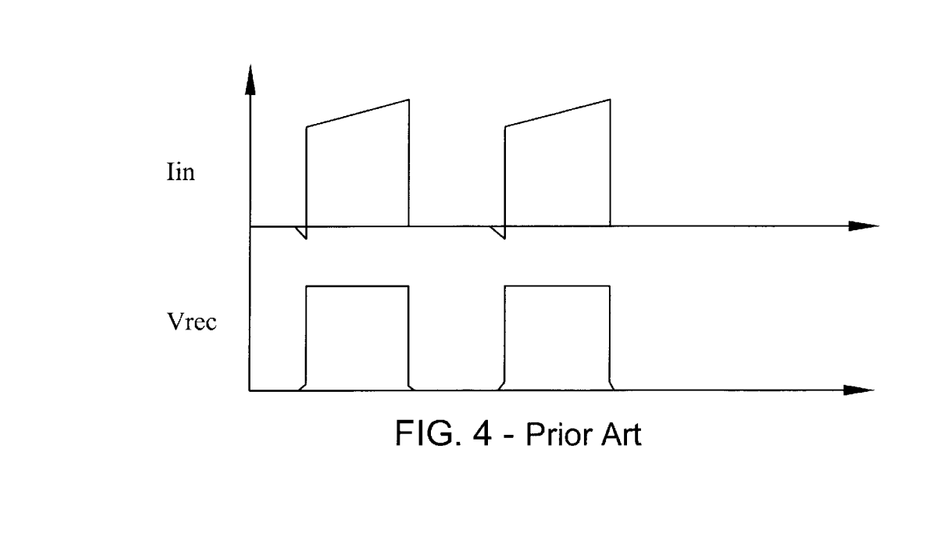
FIG. 4 provides typical waveforms of input current and rectifier output voltage of the active-clamp forward converter of FIG. 3.

Another known switch-mode converter, the active-clamp forward converter, is illustrated in FIG. 3. This type of converter includes a series-connected reset switch Q2 and a resonant capacitor $C_r$ connected in parallel with a winding of the transformer T1, in this case the primary winding. The reset switch Q2 and capacitor $C_r$ form a "reset circuit" that actively resets the transformer T1. Typical waveforms for the input current $I_{in}$ and the rectified voltage $V_{rec}$ for the active-clamp forward converter of FIG. 3 are illustrated in FIG. 4.

The active-clamp forward converter reduces the voltage stress on the active switching elements (such as the switches Q1 and Q2), thereby permitting the usage of low voltage rating devices. However, as far as the input current $I_{in}$ and output voltage $V_{out}$ are concerned, both the resonant-reset forward converter and the active-clamp forward converter have pulsating input and output power as illustrated in FIGS. 2 and 4, respectively, which necessitate bulky filtering components.

Another known switch-mode converter, the forward-flyback converter, allows the transformer flux to operate under a dc bias condition and has a continuous rectified output voltage. Its input current, however, remains pulsating. It is also known to use a separate boost inductor with a half-bridge converter to achieve both smooth input current and output voltage. The boost inductor, however, is generally bulky in order to achieve the continuous-current mode operation.

Another aspect to achieve high efficiency for switch-mode converters has been the replacement of the conventional rectifier diodes in the rectifier circuit (such as the diodes D1 and D2 in the converters of FIGS. 1 and 3) with MOSFETs, which have extremely low conduction losses. The "self-driven" scheme of synchronous rectification, which uses the secondary winding voltage to drive the rectifier MOSFET directly or feed a gate driver circuit for the MOSFET, is known to be simple, effective, and cheap. In order to use such a self-driven mechanism, it is preferable that the winding voltage on the secondary side be well balanced in the whole operating range.

In view of the preceding, there exists a need in the art for a high efficiency and cost-effective switch-mode converter that uses low voltage stress semiconductor devices, provides smooth power transfer without bulky filters, and is able to use the effective self-drive technique for the rectifier MOSFETs.

BRIEF SUMMARY OF THE INVENTION

The present invention is directed to a DC-DC switch-mode power converter. According to one embodiment, the converter includes a transformer having first and second series-connected primary windings, a first capacitor connected in series to the second primary winding, a first switch for cyclically coupling an input voltage to the first and second primary windings, a second capacitor, and a second switch for cyclically coupling the first and second primary windings to the second capacitor. The converter may also include a rectifier circuit coupled to the transformer, wherein the rectifier circuit includes a pair of self-driven synchronous rectifiers.

According to another embodiment, the converter includes a boost converter, including the first primary winding of the transformer, the first and second switches which, when energized alternately, create a current in the first primary winding, and the second capacitor connected to the second switch. In addition to the boost converter, the converter also includes an asymmetrical half-bridge converter, including the second primary winding, the first and second capacitors, the first and second switches, a secondary winding of the transformer, and a secondary circuit coupled to the secondary winding. The secondary circuit may include a rectifier circuit including a pair of self-driven synchronous rectifiers.

Embodiments of the present invention provide many advantages and improved features relative to prior art switch-mode power converters. For instance, the present invention allows low voltage rating MOSFETs with improved switching and conduction characteristics to be utilized, thus providing enhanced efficiency. An additional feature of the present invention is that the output voltage is continuous. As a result, smaller output filter components may be utilized. A further feature of the present invention is that the input current has less ripple components without using an extra magnetic component; therefore, small input filter components may be utilized. Additionally, self-driven synchronous rectifiers may be used for the rectifier circuit of the present invention, thereby realizing the enhanced efficiency associated therewith. Furthermore, the second primary side switch may turn on at a zero voltage condition, and the first primary side switch, which processes the full input power, turns on at lower voltage stress, thus realizing further efficiency benefits. These and other benefits of the present invention will be apparent from the detailed description to follow.

DESCRIPTION OF THE DRAWINGS

The present invention is described in conjunction with the following figures, wherein.

DETAILED DESCRIPTION OF THE PRESENT INVENTION

Figure 5:
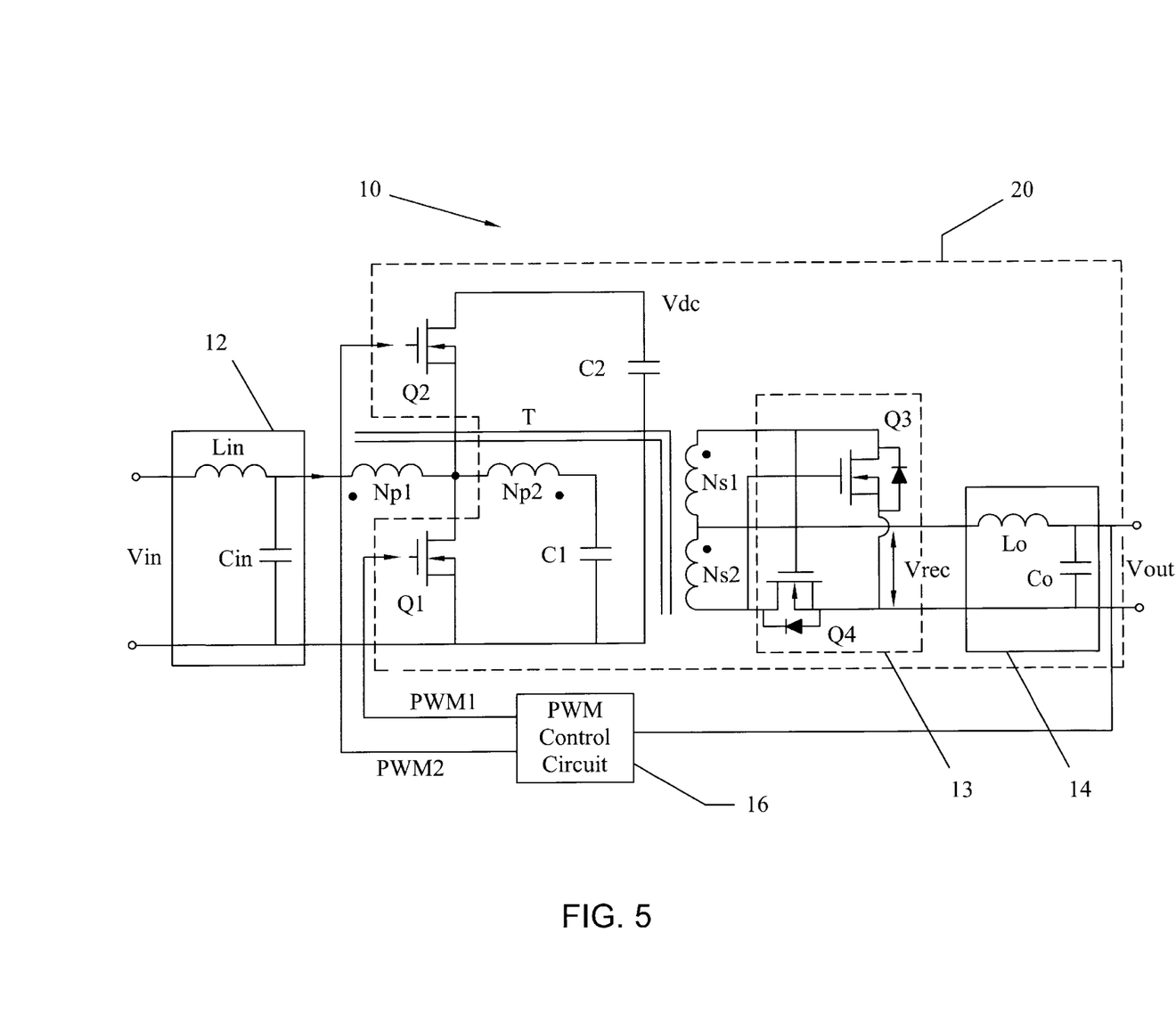
FIG. 5 is a diagram of a converter according to one embodiment of the present invention.

FIG. 5 is a diagram of a DC-DC power converter 10 according to one embodiment of the present invention. The converter 10 includes an input filter 12, a transformer T, a pair of primary side switches Q1 and Q2, a pair of primary side capacitors C1 and C2, a rectifier circuit 13, an output filter 14, and a PWM control circuit 16. The converter 10 may be used to convert an input voltage $V_{in}$ to an output voltage $V_{out}$ that may be used to power a load (not shown).

As illustrated in FIG. 5, the transformer T may include a pair of primary windings Np1 and Np2, and a pair of secondary windings Ns1 and Ns2. The input filter 12 includes an inductor $L_{in}$ and a capacitor $C_{in}$. The primary side switches Q1 and Q2 may be, for example, enhancement mode n-channel MOSFETs as illustrated in FIG. 5. The rectifier circuit 13 may include a pair of rectifying devices Q3 and Q4 that may be, for example, synchronous rectifiers such as, for example, enhancement mode n-channel MOSFETs as illustrated in FIG. 5, although according to other embodiments one or both of the rectifying devices Q3, Q4 may be diodes. In FIG. 5, the intrinsic body diodes of the synchronous MOSFETs Q3, Q4 are shown. According to other embodiments, discrete diode devices may be connected to the synchronous MOSFETs Q3, Q4 as illustrated by the intrinsic body diodes.

For the embodiment illustrated in FIG. 5, the rectifying devices Q3 and Q4 are "self-driven." That is, the voltages across the secondary windings Ns1 and Ns2 are used to control the rectifying devices Q4 and Q3, respectively. As illustrated in FIG. 5, the control terminal of the rectifying device Q3 is coupled to the second secondary winding Ns2, and the control terminal of the rectifying device Q4 is coupled to the first secondary winding Ns1. The output filter 14 is coupled to the rectifying devices Q3 and Q4, and may include an inductor Lo and a capacitor Co, as illustrated in FIG. 5. According to another embodiment, the synchronous rectifiers Q3, Q4 may be control-driven by a control circuit (not shown).

The PWM control circuit 16 may generate pulse width modulated (PWM) control signals PWM1, PWM2, which are used to control the primary side switches Q1 and Q2 respectively based on the output voltage $V_{out}$ of the converter 10 to thereby regulate the operation of the converters 10 to realize a desired output voltage $V_{out}$. According to one embodiment, the PWM control circuit 16 may include a commercially available integrated circuit (IC) such as, for example, one of the UCC 3800 series of PWM control ICs available from Texas Instruments, Inc.

The input voltage $V_{in}$ is coupled through the input filter 12 to the series connections of the primary windings Np1, Np2 and the capacitor C1. The first primary side switch Q1 couples the first primary winding Np1 to the input filter 12, and also couples the second primary winding Np2 to the capacitor C1. The second primary side switch Q2 couples the primary windings Np1, Np2 to the capacitor C2. The secondary windings Ns1, Ns2 and the two rectifying devices Q3, Q4 may be configured as a conventional center-tapped rectifier with, as discussed previously, the rectifying devices Q3, Q4 driven by the secondary winding voltages on Ns2 and Ns1 respectively. The output voltage $V_{out}$ is produced by the output filter 14 from the rectified voltage $V_{rec}$.

As such, the first primary winding Np1, the two primary side switches Q1 and Q2, and the capacitor C2 may form a boost converter. (Henceforth, the capacitor C2 is sometimes referred to as a "boost capacitor"). Furthermore, the primary winding Np2, the same primary side switches Q1 and Q2, the capacitors C1 and C2, and the secondary side of the converter 10 may form an asymmetrical half-bridge converter 20. (Henceforth, the capacitor C1 is sometimes referred to as an "energy storage capacitor"). Thus, the boost converter may be fully integrated with the asymmetrical half-bridge converter 20. As discussed previously, the output of the converter 10 may be regulated by controlling the ON and OFF times of the primary side switches Q1, Q2 according to an asymmetrical half-bridge topology. Accordingly, pursuant to one embodiment, the two primary side switches Q1 and Q2 may be turned ON and OFF complementarily by the PWM control circuit 16, except that a dead time may be provided by the PWM control circuit 16 to prevent the two switches Q1, Q2 from being turned ON simultaneously. Thus, hereinafter the term "alternately" is used to encompass the notion of complementary switching of the primary side switches Q1, Q2 with a short dead time to prevent both switches from being ON simultaneously.

Among the features of the converter 10 is that the transformer T may be reset by an appropriate voltage each switching cycle by the boost capacitor C2 depending upon the duty cycles of the first primary side switch Q1 and the input voltage $V_{in}$. Therefore, the voltage stress on both the primary and secondary switches Q1–Q4 may be lower than that in the resonant-reset forward converter described previously. Accordingly, the present invention allows the use of low voltage rating MOSFETs with improved switching and conduction characteristics, thus providing enhanced efficiency.

An additional feature of the converter 10 of the present invention is that the output voltage $V_{out}$ is continuous, as is the case for a standard asymmetrical half-bridge converter. As a result, smaller output filter components may be utilized with the present invention. A further feature of the present invention is that the input current seen by the input filter 12 has less ripple components without using an extra magnetic component. This is because most of the load current reflected to the primary side of the transformer T comes from the energy storage capacitor C1, and not from the input filter capacitor $C_{in}$. Therefore, small input filter components may be utilized with the present invention.

Another feature of the present invention is that the voltages on the secondary windings Ns1, Ns2 may be used to drive the rectifying devices Q4, Q3 according to a self-drive mechanism, as discussed previously, because the voltage throughout the switching cycles (d and 1−d, where d is the time period that the switch Q1 is ON and 1−d is the time period that the switch Q1 is OFF) are well balanced. Yet a further feature of the present invention is that the second primary side switch Q2 turns ON at a zero voltage condition, thus implying higher efficiency. In addition, the first primary side switch Q1, which processes the full input power, turns ON at lower voltage stress. Another feature of the present invention is that the transformer T has a DC bias magnetic flux in supporting the boost operation. As a result, the energy stored in the magnetizing/boost inductor (Np1) during the first interval of the switching cycle (d) is drained to the secondary side during the second interval of the switching cycle (1−d).

The relationship between the input and output voltages for the converter 10 of the present invention will now be discussed. Because the primary windings Np1, Np2 may be magnetically coupled on the same transformer core, the voltage on the energy storage capacitor C1, which is connected to the second primary winding Np2, tracks the voltage appearing on the first primary winding Np1, which is the input voltage on the capacitor $C_{in}$. Therefore, when the first primary side switch Q1 is ON, the change in the magnetic flux can be regarded as the result of the product between the input voltage and the duty cycle. When the second primary side switch Q2 turns ON, the difference between the voltage on the boost capacitor C2 and the voltage on the energy storage capacitor C1 is applied to the primary windings Np1 and Np2. Because the flux change is the same during each interval of the switching cycle (d and 1−d) in the steady state, the relationship between the input voltage $V_{in}$ and the voltage on the boost capacitor C2 ($V_{dc}$) may be represented by the following relation:

$$V_{in}d=(V_{dc}-V_{in})(1-d) \quad (1)$$

where d is the duty cycle of PWM control signals. Equation (1) may be rewritten the same as for a conventional boost converter according to the relation:

$$V_{dc}=V_{in}/(1-d) \quad (2)$$

During the first interval of the switching cycle (d), the voltage coupled to the first secondary winding Ns1 is:

$$V_1=V_{in}(Ns/Np) \quad (3)$$

where $V_1$ is the voltage of the first secondary winding Ns1 and Ns/Np is the turns ratio of the transformer T. During the second interval of the switching cycle (1−d), the voltage on the second secondary winding Ns2 is:

$$V_2=(V_{dc}-V_{in})(Ns/Np) \quad (4)$$

The total average voltage ($V_{out}$) of the rectifier voltage ($V_{rec}$) may then be approximated as:

$$V_{out}=V_1d+V_2(1-d) \quad (5)$$

Combining equations (2), (3), (4) and (5), the output voltage $V_{out}$ may be written as:

$$V_{out}=2dV_{in}(Ns/Np) \quad (6)$$

Thus, from equation (6) it is recognized that by controlling the duty cycle d, the output voltage $V_{out}$ may be regulated, and that the duty cycle may be greater than 50%, which is different from conventional asymmetrical half-bridge converters.

Figure 6A:
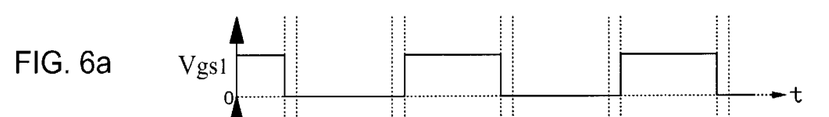
FIGS. 6a–k are idealized waveforms illustrating the operation of the converter of FIG. 5 according to one embodiment of the present invention.
Figure 6B:
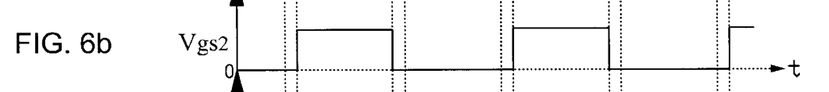

FIGS. 6a–k provide idealized waveforms illustrating the operation of the converter 10 in the steady state according to one embodiment of the present invention. FIG. 6a illustrates the gate-source voltage $V_{gs1}$ of the first primary side switch Q1, and FIG. 6b is the gate-source voltage $V_{gs2}$ of the second primary side switch Q2. As can be seen in FIGS. 6a and 6b, the switch Q1 is turned ON and the switch Q2 is turned OFF during the time period t1 to t2. Conversely, during the time period t3 to t4, the switch Q1 is OFF and the switch Q2 is ON. In addition, as discussed previously, both switches Q1 and Q2 are turned OFF during the time periods t2 to t3 and t4 and t5. The switching cycle may thus be defined as the time period t1 to t5, with the time period d being t1 to t2 and the time period (1−d) being t2 to t5.

Figure 6C:
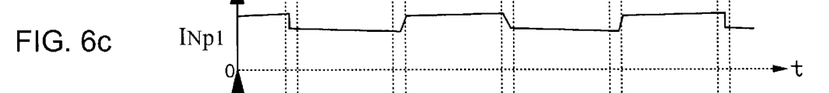
Figure 6D:
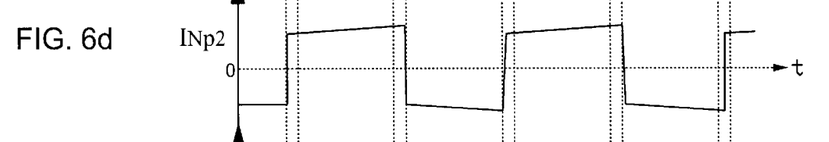
Figure 6E:
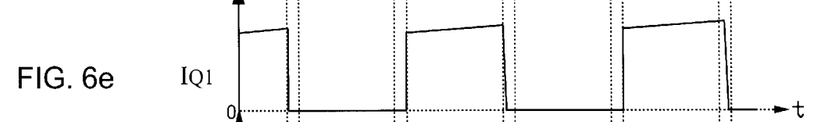
Figure 6F:
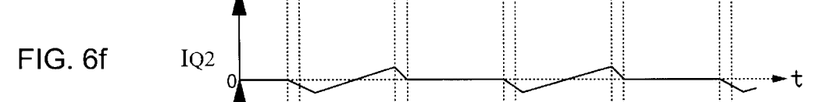
Figure 6G:
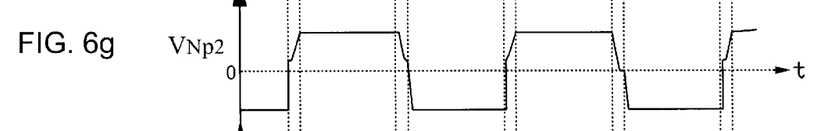
Figure 6H:
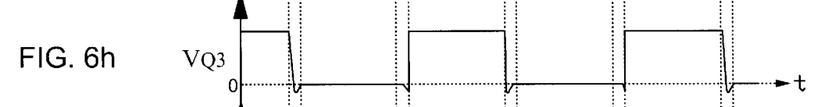
Figure 6I:
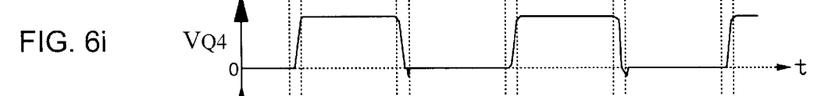
Figure 6J:
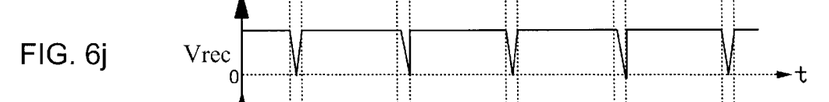
Figure 6K:
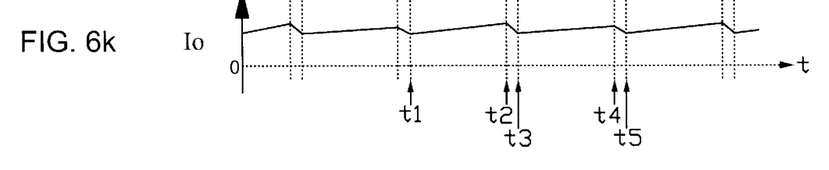

FIG. 6c illustrates the current $I_{Np1}$ in the first primary winding Np1, which is also the current seen by the input filter 12. FIG. 6d illustrates the current $I_{Np2}$ flowing from the second primary winding Np2 into the energy storage capacitor C1. FIG. 6e illustrates the current $I_{Q1}$ flowing from the drain terminal to the source terminal of the first primary side switch Q1, and FIG. 6f illustrates the current $I_{Q2}$ flowing from the drain terminal to the source terminal of the second primary side switch Q2. FIG. 6g illustrates the voltage $V_{Np2}$ applied to the second primary winding Np2, which corresponds to the voltage appearing on the first primary winding Np1, assuming a perfect coupling between the two primary windings Np1 and Np2. FIG. 6h illustrates the voltage $V_{Q3}$ between the drain and source terminals of the rectifying device Q3, and FIG. 6i illustrates the voltage $V_{Q4}$ between the drain and source terminals of the rectifying device Q4. FIG. 6j illustrates the rectified voltage $V_{rec}$ by the rectifying devices Q3, Q4. This voltage is averaged by the output filter 14 to yield the output voltage $V_{out}$. FIG. 6k illustrates the current 10 in the inductor Lo, which is averaged to yield the load current.

The operation of the converter 10 is now described with reference to FIGS. 6a–k. During the time period t1 to t2, the switch Q1 is turned ON and the switch Q2 is turned OFF. The input voltage $V_{in}$ is thus applied to the primary windings Np1, Np2, as illustrated in FIGS. 6d, e, and g. (Note that because Np1 and Np2 are of opposite polarity, the current in Np1 is positive and the current in Np2 is negative.) Because the primary windings Np1, Np2 are coupled on the same magnetic core, the voltage on the energy storage capacitor C1 equals the input voltage $V_{in}$. This voltage is coupled to the secondary side of the converter 10 by the transformer T according to the turns ratio of the transformer (Ns/Np). The rectifying device Q4 is turned ON in this interval because its gate-source voltage is positive, and the rectifying device Q3 is turned OFF. As a result, the voltage on the second secondary winding Ns2 is applied to the output filter 14. At the same time, the output inductor Lo current flows through the rectifying device Q4 and the second secondary winding Ns2. This current is reflected to the primary side windings Np1, Np2. The amount of current in each winding Np1, Np2 is determined by the capacitance associated with the windings pursuant to the relation:

$$i = C \frac{\Delta V}{\Delta t} \tag{7}$$

Because the voltage changes ($\Delta V$) are kept equal by the coupled windings for the same $\Delta t$, the current is proportional to the capacitance. Therefore, a large energy storage capacitor C1 may be used relative to the input filter capacitor $C_{in}$ so that most current flows into the energy storage capacitor C1. Accordingly, the input current in the first primary winding Np1 has less current ripple. During this time interval (t1 to t2), the magnetizing inductance of the transformer T is charged with energy. The total current, including the magnetizing current and the reflected load current, flow through the switch Q1.

The interval t2 to t3 is the so-called "dead time" because both of the primary side switches Q1, Q2 are OFF. During this interval, the energy stored in the magnetizing inductance is about to divert into two paths toward the capacitors C1 and C2, as the original path through the switch Q1 is cutting off. When the voltage on the switch Q1 is slightly higher than the input voltage $V_{in}$, the voltages on the secondary windings Ns1 and Ns2 change polarity. As a result, the rectifying device Q3 conducts current through the first secondary winding Ns1, and the current in the second primary winding Np2 changes direction.

During the interval t3 to t4, the switch Q2 is turned ON and the switch Q1 is kept OFF. Because the voltage on the boost capacitor C2 is greater than the voltage on the energy storage capacitor C1, the primary winding Np2 sees a reversed voltage. This voltage resets the magnetizing flux of the transformer T, and also keeps the rectifying device Q3 turned ON. As a result, the voltage on the first secondary winding Ns1 is applied to the output filter 14. The output inductor Lo current flows from the first secondary winding Ns1 to the load and returns through the rectifying device Q3. In addition, the current in the first secondary winding Ns1 is reflected back to the primary side. The distribution of the current in the primary windings is similar to the time interval of t1–t2. The net current in the first primary winding Np1 is composed of the magnetizing current and a part of the load current. The design of the converter 10 ensures that most of load current flows into the second primary winding Np2. Therefore, the current in the first primary winding Np1 is the sum of the magnetizing current and a lesser amount of the load current. The net current flowing into the boost capacitor is zero because the average voltage doe not change in steady state. Therefore, a small MOSFET may be used for the switch Q2.

During the time interval t4 to t5, both of the primary side switches Q1, Q2 are again turned OFF. As the switch Q2 turns OFF, the magnetizing current must flow through the energy storage capacitor C1. Even though the voltage on the switch Q2 drops to approximately the input voltage $V_{in}$, the current in the first secondary winding Ns1 does not change its direction until the switch Q1 is turned ON. After time t5, the cycle (from t1 to t5) is repeated.

Figure 7:
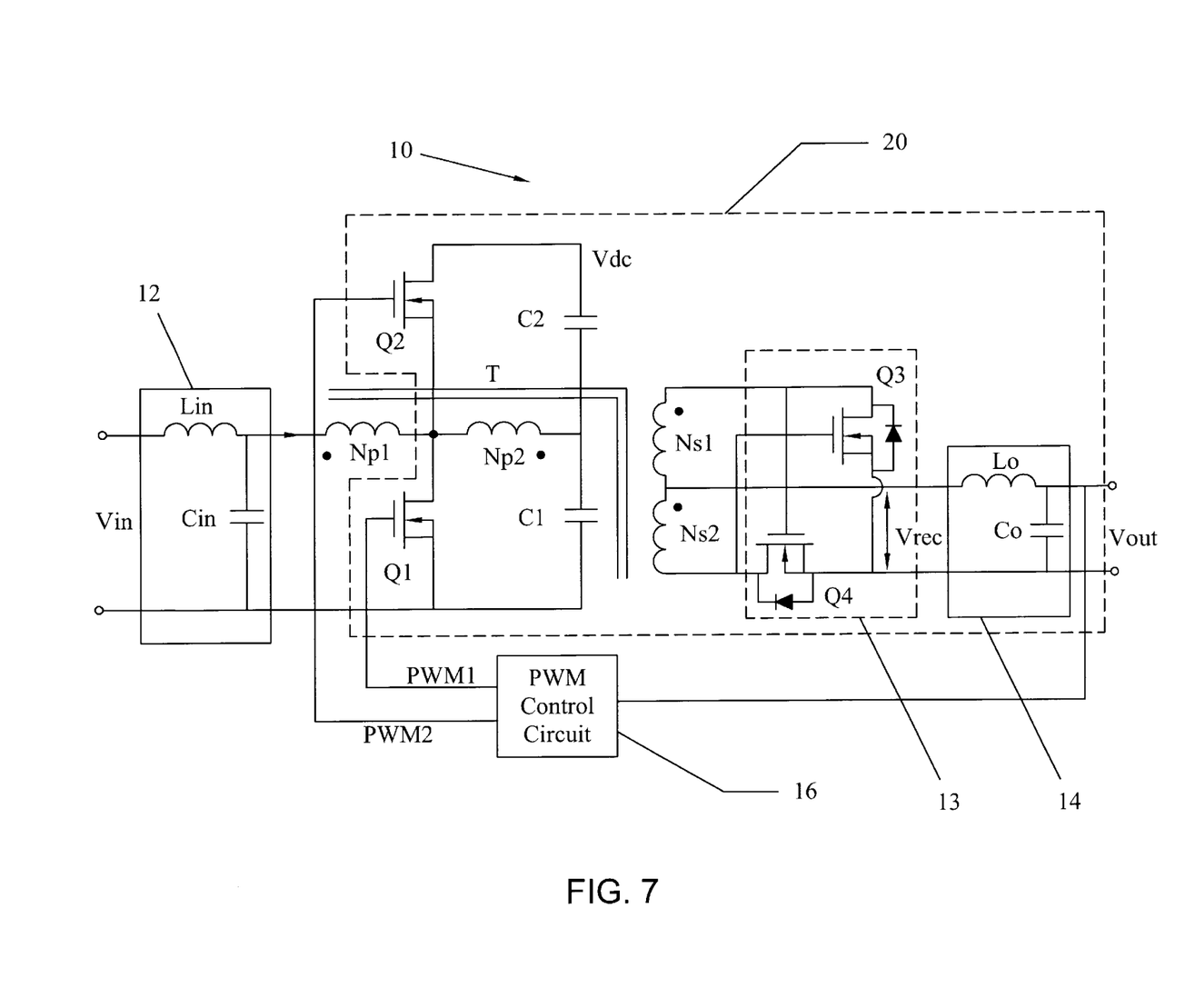
FIGS. 7–11 are diagrams of the converter according to other embodiments of the present invention.
Figure 8:
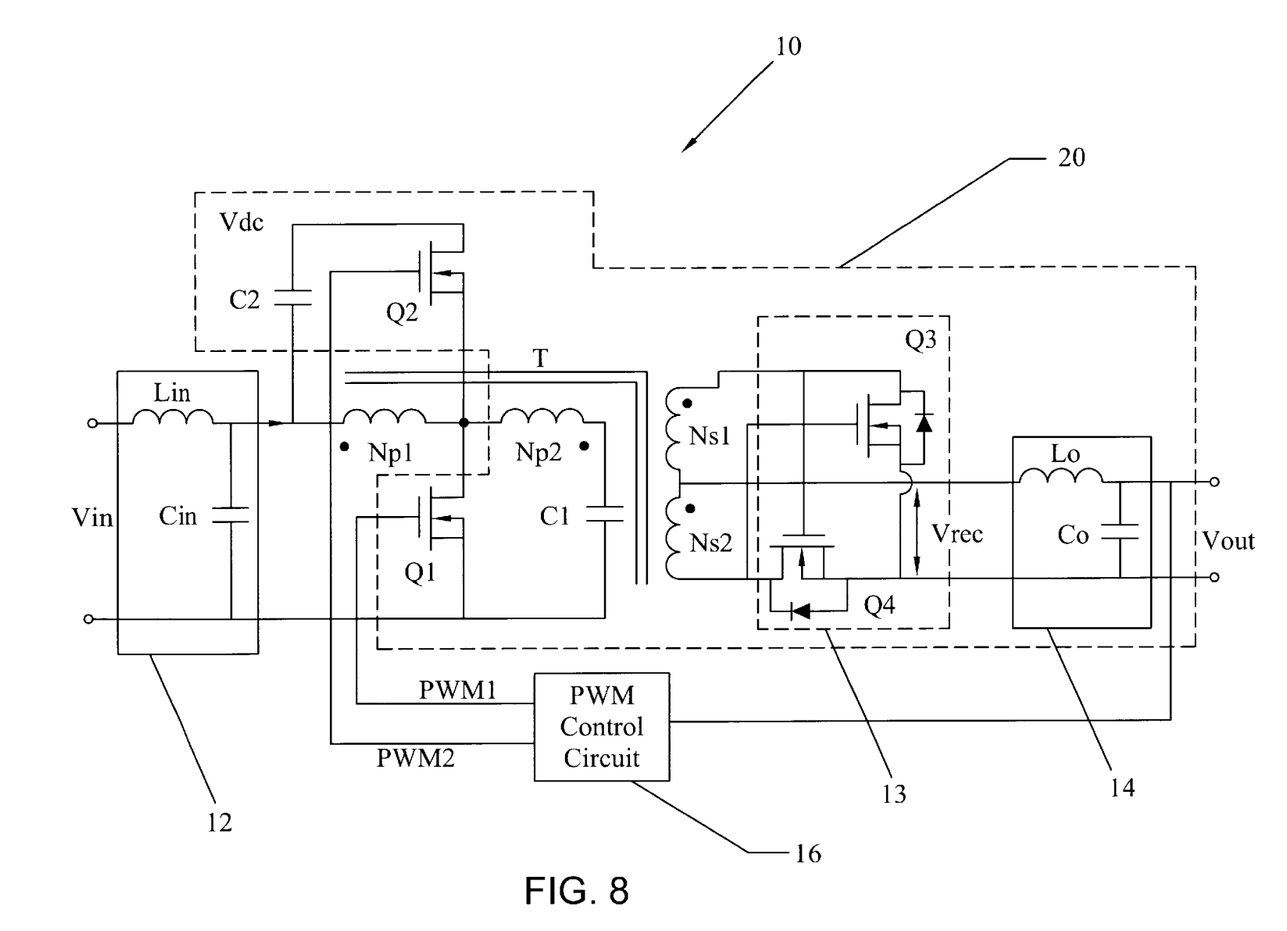
Figure 9:
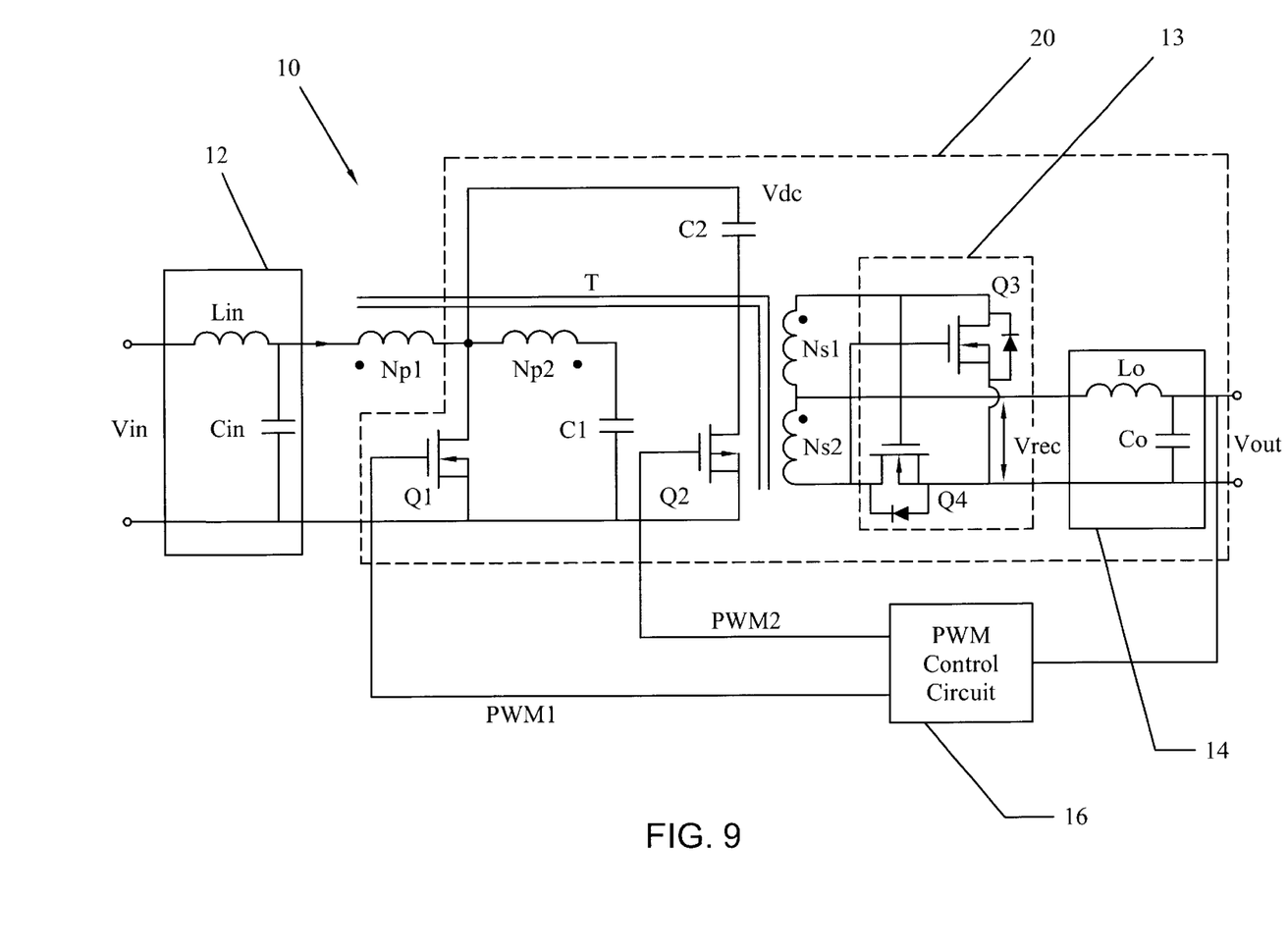

FIGS. 7–9 are diagrams of the converter 10 according to other embodiments of the present invention. In FIG. 7, the capacitor C2 is connected in series with the capacitor C1. In FIG. 8, the capacitor C2 is connected to the input filter capacitor $C_{in}$ and the drain terminal of the switch Q2. The converter of FIG. 9 is similar to that of FIG. 5, except that the switch Q2 has been replaced with a p-channel MOSFET and is connected between the capacitor C2 and the source terminal of the switch Q1. According to such an embodiment, the switches Q1 and Q2 may be driven by two PWM control signals referred to the same ground. No floating gate driver is necessary.

Figure 10:
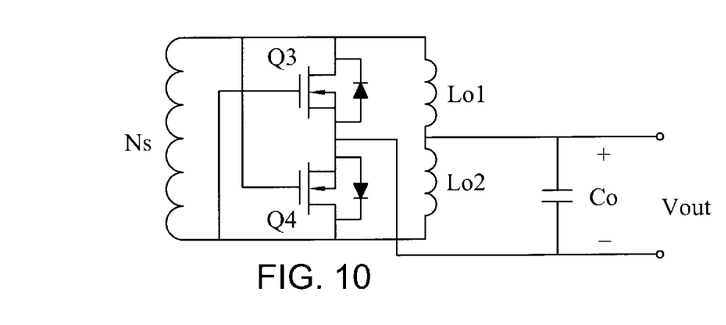

FIG. 10 is a diagram of the secondary side of the converter 10 according to another embodiment of the present invention. In FIG. 10, the transformer T includes one secondary winding Ns. The control terminal of the rectifying device Q3 is connected to one terminal of the secondary winding Ns, and the control terminal of the rectifying device Q4 is connected to the other terminal. A pair of series-connected output inductors Lo1, Lo2 is connected in parallel with the rectifying devices Q3, Q4. The output capacitor Co is connected between a node between the output inductor Lo1, Lo2 and a node between the rectifying devices Q3, Q4. The topology of FIG. 10 corresponds to the so-called current doubler configuration.

Figure 11:
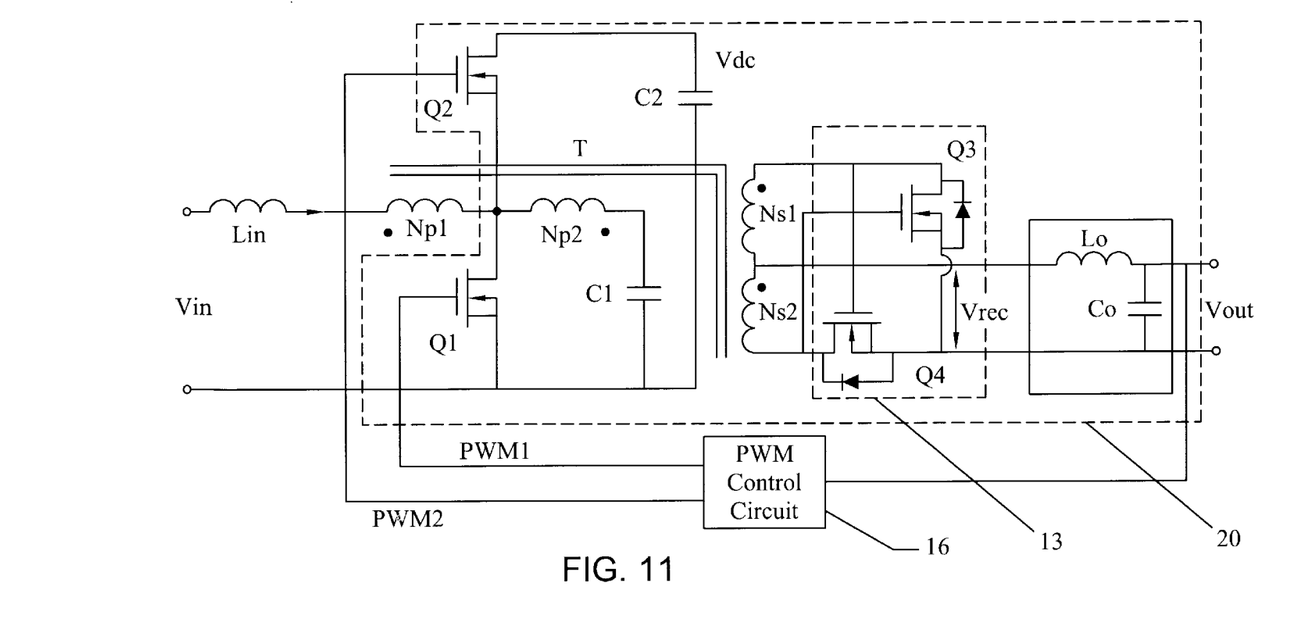

FIG. 11 is a diagram of the converter 10 according to another embodiment of the present invention. The converter 10 of FIG. 11 is similar to that of FIG. 5 except that the input capacitor $C_{in}$ is removed. Such an embodiment may be utilized where, for example the input capacitor $C_{in}$ is so small that its removal does not adversely affect the performance of the converter 10.

Although the present invention has been described herein with respect to certain embodiments, those of ordinary skill in the art will recognize that many modifications and variations of the present invention may be implemented. The foregoing description and the following claims are intended to cover all such modifications and variations.

What is claimed is:

1. A converter, comprising:

an input filter;

an asymmetrical half-bridge converter including a transformer including a first primary winding and at least one secondary winding, first and second switches which, when energized alternately, create an alternating current through the first primary winding, a first capacitor connected to the first primary winding, a second capacitor connected to the second switch and coupled across the first and second switches, and a rectifier circuit connected to the secondary winding; and a second primary winding magnetically coupled to the first primary winding, wherein the input filter, the first primary winding and the second primary winding are connected in series.

2. The converter of claim 1, wherein the first capacitor has a first terminal connected to the first primary winding, and wherein the second capacitor is connected between the second switch and a second terminal of the first capacitor.

3. The converter of claim 1, wherein:
the first switch is a n-channel MOSFET; and
the second switch is a n-channel MOSFET.

4. The converter of claim 1, wherein:
the transformer of the asymmetrical half-bridge converter includes first and second secondary windings; and
the rectifier circuit includes first and second self-driven synchronous rectifiers.

5. The converter of claim 4, wherein:
a second terminal of the first secondary winding is connected to a first terminal of the second secondary winding;
the first synchronous rectifier includes a control terminal connected to a second terminal of second secondary winding, a first terminal connected to a first terminal of the first secondary winding, and a second terminal; and
the second synchronous rectifier includes a control terminal connected to the first terminal of first secondary winding, a first terminal connected to the second terminal of the second secondary winding, and a second terminal connected to the second terminal of the first synchronous rectifier.

6. The converter of claim 1, further comprising a current doubler circuit connected to rectifier circuit.

7. A converter, comprising:
a transformer including first and second series-connected primary windings and first and second series-connected secondary windings;
first and second primary side switches which, when energized alternately, create an alternating current through the second primary winding;
an input filter connected in series with the first and second series-connected primary windings;
a first capacitor connected in series to the second primary winding;
a second capacitor connected to the second primary side switch and coupled across the first and second side primary switches;
a first synchronous rectifier having a control terminal responsive to a voltage across the first secondary winding;
a second synchronous rectifier having a control terminal responsive to a voltage across the second secondary winding; and
an output filter connected to the first and second synchronous rectifiers.

8. The converter of claim 7, wherein
the first primary side switch includes a first terminal connected to the first primary winding;
the second primary side switch includes a first terminal connected to the first terminal of the first primary side switch; and
the second capacitor includes a first terminal connected to a second terminal of the second primary side switch and a second terminal connected to a second terminal of the first primary side switch.

9. A converter, comprising:
an asymmetrical half-bridge converter including a transformer including a first primary winding and at least one secondary winding, first and second switches which, when energized alternately, create an alternating current through the first primary winding, a first capacitor connected to the first primary winding, a second capacitor connected to the second switch, and a rectifier circuit connected to the secondary winding, and wherein:
the first capacitor has a first terminal connected to the first primary winding; and
the second capacitor is coupled across the first and second switches and connected between the second switch and a second terminal of the first capacitor; and
a second primary winding magnetically coupled to the first primary winding and connected in series with the first primary winding.

10. A converter, comprising:
an asymmetrical half-bridge converter including a transformer including a first primary winding, first and second secondary windings, and first and second switches which, when energized alternately, create an alternating current through the first primary winding, a first capacitor connected to the first primary winding, a second capacitor connected to the second switch and coupled across the first and second switches, and a rectifier circuit connected to the secondary winding, wherein the rectifier circuit includes first and second self-driven synchronous rectifiers, wherein:
a second terminal of the first secondary winding is connected to a first terminal of the second secondary winding;
the first synchronous rectifier includes a control terminal connected to a second terminal of the second secondary winding, a first terminal connected to a first terminal of the first secondary winding, and a second terminal; and
the second synchronous rectifier includes a control terminal connected to the first terminal of the first secondary winding, a first terminal connected to the second terminal of the second secondary winding, and a second terminal connected to the second terminal of the first synchronous rectifier; and
a second primary winding magnetically coupled to the first primary winding and connected in series with the first primary winding.

11. A converter, comprising:
an asymmetrical half-bridge converter including a transformer including a first primary winding and at least one secondary winding, first and second switches which, when energized alternately, create an alternating current through the first primary winding, a first capacitor connected to the first primary winding, a second capacitor connected to the second switch and coupled across the first and second switches, and a rectifier circuit connected to the secondary winding;
a second primary winding magnetically coupled to the first primary winding and connected in series with the first primary winding; and
an inductor connected in series with the second primary winding.

12. A converter, comprising:
an asymmetrical half-bridge converter including a transformer including a first primary winding and at least one secondary winding, first and second switches which, when energized alternately, create an alternating current through the first primary winding, a first capacitor connected to the first primary winding, a second capacitor connected to the second switch and coupled across the first and second switches, and a rectifier circuit connected to the secondary winding;
a second primary winding magnetically coupled to the first primary winding and connected in series with the first primary winding; and a current doubler circuit connected the rectifier circuit.

13. A converter, comprising:
   a transformer including first and second series-connected primary windings and first and second series-connected secondary windings;
   first and second primary side switches which, when energized alternately, create an alternating current through the second primary winding, wherein the first primary side switch includes a first terminal connected to the first primary winding and wherein the second primary switch includes a first terminal connected to the first terminal of the first primary switch;
   a first capacitor connected in series to the second primary winding;
   a second capacitor connected to the second primary side switch and coupled across the first and second primary side switches, wherein the second capacitor includes a first terminal connected to a second terminal of the second primary side switch and a second terminal connected to a second terminal of the first primary side switch;
   a first synchronous rectifier having a control terminal responsive to a voltage across the first secondary winding;
   a second synchronous rectifier having a control terminal responsive to a voltage across the second secondary winding; and
   an output filter connected to the first and second synchronous rectifiers.

14. A converter, comprising:
   a transformer having first and second series-connected primary windings;
   a first capacitor having a first terminal connected in series to the second primary winding;
   a first switch for cyclically coupling an input voltage to the first and second primary windings;
   a second capacitor; and
   a second switch for cyclically coupling the first and second primary windings to the second capacitor, wherein the second capacitor is connected between the second switch and a second terminal of the first capacitor.

15. The converter of claim 14, wherein:
   the first switch is a n-channel MOSFET; and
   the second switch is a n-channel MOSFET.

16. The converter of claim 14, further comprising a control circuit for alternately driving the first and second switches such that the first and second switches are not simultaneously conductive.

17. The converter of claim 16, further comprising an input filter connected to the first primary winding.

18. The converter of claim 16, further comprising an inductor connected in series with the first primary winding.

19. The converter of claim 16, wherein the transformer includes first and second series-connected secondary windings, and further comprising:
   a first rectifying device connected to the first secondary winding; and
   a second rectifying device connected to the second secondary winding.

20. The converter of claim 19, wherein at least one of the first and second rectifying devices includes a MOSFET.

21. The converter of claim 19, wherein:
   the first rectifying device is a self-driven MOSFET; and
   the second rectifying device is a self-driven MOSFET.

22. The converter of claim 16, wherein the transformer includes first and second series-connected secondary windings, wherein a second terminal of the first secondary winding is connected to a first terminal of the second secondary winding, and further comprising:
   a first synchronous rectifier having a control terminal connected to a second terminal of second secondary winding, a first terminal connected to a first terminal of the first secondary winding, and a second terminal; and
   a second synchronous rectifier having a control terminal connected to the first terminal of first secondary winding, a first terminal connected to the second terminal of the second secondary winding, and a second terminal connected to the second terminal of the first synchronous rectifier.

23. The converter of claim 22, further comprising an output filter connected between the second terminal of the first secondary winding and the second terminal of the first synchronous rectifier.

24. The converter of claim 16, wherein the transformer includes a secondary winding, and further comprising a current doubler circuit connected to the secondary winding.

25. A converter, comprising:
   a transformer having first and second series-connected primary windings;
   a first capacitor having a first terminal connected in series to the second primary winding;
   a first switch for cyclically coupling an input voltage to the first and second primary windings;
   a second capacitor; and
   a second switch for cyclically coupling the first and second primary windings to the second capacitor, wherein the second capacitor is connected between the second switch and a first terminal of the first capacitor.

26. The converter of claim 25, wherein:
   the first switch is a n-channel MOSFET; and
   the second switch is a n-channel MOSFET.

27. The converter of claim 25, further comprising a control circuit for alternately driving the first and second switches such that the first and second switches are not simultaneously conductive.

28. The converter of claim 27, further comprising an input filter connected to the first primary winding.

29. The converter of claim 27, further comprising an inductor connected in series with the first primary winding.

30. The converter of claim 27, wherein the transformer includes first and second series-connected secondary windings, and further comprising:
   a first rectifying device connected to the first secondary winding; and
   a second rectifying device connected to the second secondary winding.

31. The converter of claim 30, wherein at least one of the first and second rectifying devices includes a MOSFET.

32. The converter of claim 30, wherein:
   the first rectifying device is a self-driven MOSFET; and
   the second rectifying device is a self-driven MOSFET.

33. The converter of claim 27, wherein the transformer includes first and second series-connected secondary windings, wherein a second terminal of the first secondary winding is connected to a first terminal of the second secondary winding, and further comprising:
   a first synchronous rectifier having a control terminal connected to a second terminal of second secondary winding, a first terminal connected to a first terminal of the first secondary winding, and a second terminal; and a second synchronous rectifier having a control terminal connected to the first terminal of first secondary winding, a first terminal connected to the second terminal of the second secondary winding, and a second terminal connected to the second terminal of the first synchronous rectifier.

34. The converter of claim 33, further comprising an output filter connected between the second terminal of the first secondary winding and the second terminal of the first synchronous rectifier.

35. The converter of claim 27, wherein the transformer includes a secondary winding, and further comprising a current doubler circuit connected to the secondary winding.

36. The converter of claim 27, wherein the transformer includes a secondary winding, and further comprising a current doubler circuit connected to the secondary winding.

37. A converter, comprising:
a transformer having first and second primary windings, wherein the first primary winding includes a first terminal and a second terminal, and wherein the second terminal of the first primary winding is series-connected to the second primary winding;
a first capacitor connected in series to the second primary winding;
a first switch for cyclically coupling an input voltage to the first and second primary windings;
a second capacitor; and
a second switch for cyclically coupling the first and second primary windings to the second capacitor, wherein the second capacitor is connected between the second switch and the first terminal of the first primary winding.

38. The converter of claim 37, wherein:
the first switch is a n-channel MOSFET; a
the second switch is a n-channel MOSFET.

39. The converter of claim 37, further comprising a control circuit for alternately driving the first and second switches such that the first and second switches are not simultaneously conductive.

40. The converter of claim 39, further comprising an input filter connected to the first primary winding.

41. The converter of claim 40, further comprising an inductor connected in series with the first primary winding.

42. The converter of claim 40, wherein the transformer includes first and second series-connected secondary windings, and further comprising:
a first rectifying device connected to the first secondary winding; and
a second rectifying device connected to the second secondary winding.

43. The converter of claim 42, wherein at least one of the first and second rectifying devices includes a MOSFET.

44. The converter of claim 42, wherein:
the first rectifying device is a self-driven MOSFET; and
the second rectifying device is a self-driven MOSFET.

45. The converter of claim 39, wherein the transformer includes first and second series-connected secondary windings, wherein a second terminal of the first secondary winding is connected to a first terminal of the second secondary winding, and further comprising:
a first synchronous rectifier having a control terminal connected to a second terminal of second secondary winding, a first terminal connected to a first terminal of the first secondary winding, and a second terminal; and a second synchronous rectifier having a control terminal connected to the first terminal of first secondary winding, a first terminal connected to the second terminal of the second secondary winding, and a second terminal connected to the second terminal of the first synchronous rectifier.

46. The converter of claim 45, further comprising an output filter connected between the second terminal of the first secondary winding and the second terminal of the first synchronous rectifier.

47. A converter, comprising:
a transformer having first and second series-connected primary windings, wherein a second terminal of the first primary winding is connected to a first terminal of the second primary winding;
a first switch for cyclically coupling an input voltage to the first primary winding, wherein the first switch includes a first terminal connected to the second terminal of the first primary winding;
a first capacitor connected to a second terminal of the second primary winding;
a second switch having a first terminal connected to the second terminal of the first primary winding; and
a second capacitor connected to a second terminal of the second switch, wherein the second capacitor includes a first terminal connected to the second terminal of the second switch and a second terminal connected to the second terminal of the first switch.

48. The converter of claim 47, further comprising a control circuit for alternately driving the first and second switches such that the first and second switches are not simultaneously conductive.

49. The converter of claim 47, further comprising an input filter connected to a first terminal of the first primary winding.

50. The converter of claim 47, further comprising an inductor connected in series with the first primary winding.

51. The converter of claim 47, wherein the transformer includes first and second series-connected secondary windings, wherein a second terminal of the first secondary winding is connected to a first terminal of the second secondary winding, and further comprising:
a first synchronous rectifier having a control terminal connected to a second terminal of the second secondary winding, a first terminal connected to a first terminal of the first secondary winding, and a second terminal; and
a second synchronous rectifier having a control terminal connected to the first terminal of first secondary winding, a first terminal connected to the second terminal of the second secondary winding, and a second terminal connected to the second terminal of the first synchronous rectifier.

52. The converter of claim 51, further comprising an output filter connected between the second terminal of the first secondary winding and the second terminal of the first synchronous rectifier.

53. The converter of claim 47, wherein the transformer includes a secondary winding, and further comprising a current doubler circuit connected to the secondary winding.

54. A converter, comprising:
a transformer having first and second series-connected primary windings, wherein a second terminal of the first primary winding is connected to a first terminal of the second primary winding;
a first switch for cyclically coupling an input voltage to the first primary winding, wherein the first switch includes a first terminal connected to the second terminal of the first primary winding;

a first capacitor connected to a second terminal of the second primary winding;

a second switch having a first terminal connected to the second terminal of the first primary winding; and a second capacitor connected to a second terminal of the second switch, wherein the second capacitor includes a first terminal connected to the second terminal of the second switch and a second terminal connected to a first terminal of the first primary winding.

55. The converter of claim 54, further comprising a control circuit for alternately driving the first and second switches such that the first and second switches are not simultaneously conductive.

56. The converter of claim 54, further comprising an input filter connected to a first terminal of the first primary winding.

57. The converter of claim 54, further comprising an inductor connected in series with the first primary winding.

58. The converter of claim 54, wherein the transformer includes first and second series-connected secondary windings, wherein a second terminal of the first secondary winding is connected to a first terminal of the second secondary winding, and further comprising:

a first synchronous rectifier having a control terminal connected to a second terminal of the second secondary winding, a first terminal connected to a first terminal of the first secondary winding, and a second terminal; and a second synchronous rectifier having a control terminal connected to the first terminal of first secondary winding, a first terminal connected to the second terminal of the second secondary winding, and a second terminal connected to the second terminal of the first synchronous rectifier.

59. The converter of claim 58, further comprising an output filter connected between the second terminal of the first secondary winding and the second terminal of the first synchronous rectifier.

60. The converter of claim 54, wherein the transformer includes a secondary winding, and further comprising a current doubler circuit connected to the secondary winding.

* * * * *